United States Patent [19]

Leutner et al.

[11] 4,336,234
[45] Jun. 22, 1982

[54] PREPARATION OF STORAGE-STABLE, PUMPABLE AND POURABLE ALUMINOSILICATE SUSPENSIONS BY WET MILLING

[75] Inventors: Bernd Leutner, Frankenthal; Hans-Ulrich Schlimper, Speyer; Dieter Roth, Frankenthal; Ludwig Kreitner, Heppenheim; Heinrich Spahn, Mannheim, all of Fed. Rep. of Germany

[73] Assignee: BASF Aktiengesellschaft, Fed. Rep. of Germany

[21] Appl. No.: 119,957

[22] Filed: Feb. 8, 1980

[30] Foreign Application Priority Data

Feb. 13, 1979 [DE] Fed. Rep. of Germany ....... 2907108

[51] Int. Cl.³ .................... C01B 33/28; B01J 13/00
[52] U.S. Cl. .................................... 423/329; 241/16; 252/174.25; 252/313 R; 423/328
[58] Field of Search ................................ 423/328–330; 252/455 Z, 174.25, 313 R; 106/288 B; 241/15, 16, 21

[56] References Cited

U.S. PATENT DOCUMENTS

| | | | |
|---|---|---|---|
| 3,310,373 | 3/1967 | Johnson | 423/329 |
| 3,985,669 | 10/1976 | Krummel et al. | 423/328 X |
| 4,041,135 | 8/1977 | Williams et al. | 423/329 |
| 4,072,622 | 2/1978 | Kuhling et al. | 423/328 |
| 4,173,622 | 11/1979 | Robertson | 423/329 |

FOREIGN PATENT DOCUMENTS 2744784 8/1978 Fed. Rep. of Germany .

*Primary Examiner*—Edward J. Meros
*Attorney, Agent, or Firm*—Keil & Witherspoon

[57] ABSTRACT

Storage-stable, pourable and pumpable silicate suspensions are prepared by wet milling of aluminosilicates, after the preparation of the latter, without intermediate drying.

5 Claims, 1 Drawing Figure

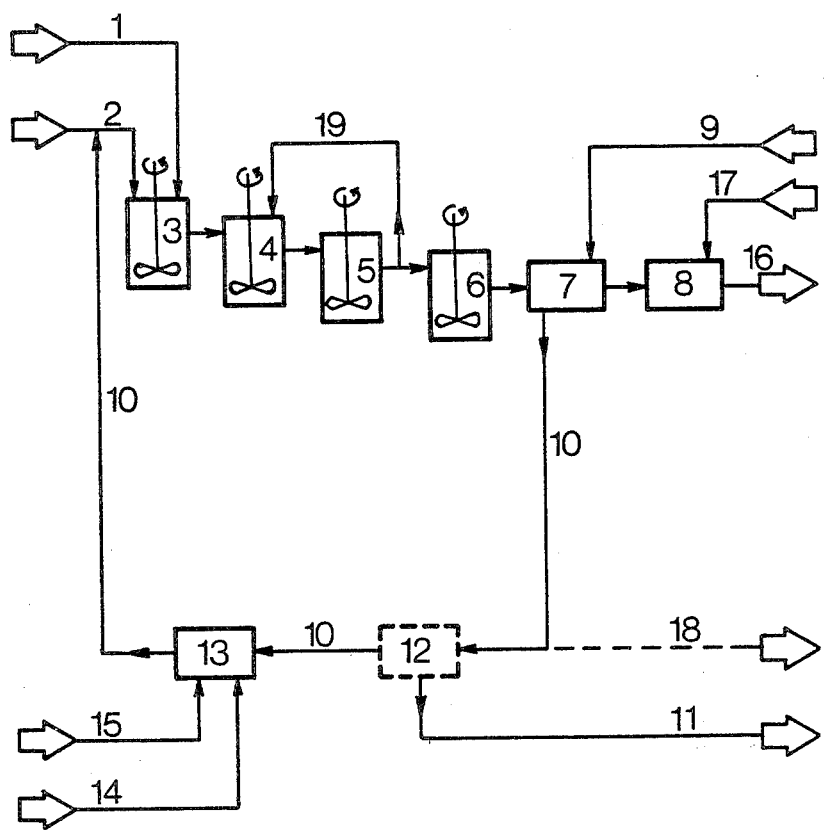

PREPARATION OF STORAGE-STABLE, PUMPABLE AND POURABLE ALUMINOSILICATE SUSPENSIONS BY WET MILLING

The invention relates to a process for the preparation of aluminosilicate suspensions which are storagestable, pumpable and pourable, without requiring dispersants and stabilizers, by wet milling of the aluminosilicates.

Aluminosilicates containing cations which are capable of calcium ion exchange are described, in German Laid-Open Application Nos. DOS 2,412,836 and DOS 2,412,838, as phosphate substitutes in detergents and cleaners.

In compounding detergents and cleaners it is advantageous to handle these aluminosilicates in the form of relatively highly concentrated suspensions or slurries, since prior drying of the aluminosilicates is economically disadvantageous, due to the additional costs entailed.

Since, however, these slurries often exhibit considerable sedimentation of the aluminosilicates on storage and on pumping, dispersants have hitherto been added to them. German Laid-Open Application No. DOS 2,615,698 proposes salts of polymeric carboxylic acids, eg. sodium polyacrylate, as dispersants, and non-surfactant, phosphorus-free, inorganic or organic salts, eg. sodium citrate, as stabilizers.

Such ingredients constitute expensive additives, particularly since they must be used in relatively high concentrations, and are furthermore not completely satisfactory in relation to legislation for protection of the environment, since polyacrylates possess poor biological degradability.

It is an object of the present invention to provide a process which permits the preparation of finely divided, storage-stable and pumpable aluminosilicate suspensions without the use of dispersants and stabilizers.

We have found, surprisingly, that this object is achieved by employing a wet milling process.

In the process for the preparation of storagestable, pourable and pumpable aqueous suspensions which contain, based on the suspension, from 20 to about 60 percent by weight of finely divided, water-insoluble aluminosilicates with calcium-exchangeable cations, by wet milling of the aluminosilicates, the aluminosilicates which are obtained in aqueous suspension after their preparation are separated off mechanically, the resulting moist aluminosilicate mass is wet-milled without intermediate drying, either directly or after having added water to bring its water content to a value of up to 80 percent by weight, and the resulting milled material is, where necessary, brought to the desired solids content.

Wet milling processes are known per se in this field of technology. For example, German Published Application No. DAS 1,218,415 discloses that crystalline zeolite (aluminosilicate) powder can be suspended in water and wet-milled. However, quite apart from the fact that very long residence times in the mill are required, this method does not give storage-stable suspensions, as is shown below.

For the purposes of the invention, "aluminosilicates" are amorphous and crystalline zeolites, which contain cations which are replaceable by calcium ions. All zeolites which possess a sufficient exchange capacity for calcium ions may be used, but preferred types are those of the formula $$(0.8-1.2)Me_2O \cdot Al_2O_3 \cdot (1.8-2.2)SiO_2 \cdot (0-6)H_2O$$

where Me is an alkali metal, preferably sodium or potassium.

Suitable methods of synthesis of these types are all those which work on the hydrothermal principle, ie. which are carried out in an aqueous medium by heating alkali metal silicate and alkali metal aluminate donors or heating aluminum silicate and an alkali metal hydroxide (see below); depending on the reaction conditions, amorphous or crystalline zeolites are formed.

A method which gives compounds suitable for wet milling in accordance with the invention is described, for example, in German Published Application No. DAS 2,744,784, according to which solutions or suspensions containing $SiO_2$, $Al_2O_3$ and an alkali metal hydroxide are combined and subjected to hydrothermal treatment.

Particularly advantageous starting materials for the process according to the invention are obtained by a continuous hydrothermal process defined in claims 4 and 5 and described below, which gives a particularly coarse and therefore particularly easily isolated starting material. This process gives suspensions of aluminosilicates with particle sizes of >10 and frequently even >15 μm.

In general, the procedure followed is that an alkali metal aluminate and alkali metal silicate, or an alkali metal hydroxide and an aluminum silicate, in aqueous solution or suspension, are introduced, at from 30° to 100° C., into the first stage of the operation, with vigorous stirring.

It is also possible to employ alkali metal aluminate and alkali metal silicate donors, such as an alkali metal hydroxide and $Al_2O_3$ or $Al(OH)_3$ or an alkali metal hydroxide and $SiO_2$, silicic acid, a silica sol or kieselguhr.

The general and most advantageous procedure is to combine $Al_2O_3$ or $Al(OH)_3$, an alkali metal hydroxide and $SiO_2$ in the forms referred to above, or to combine aluminum silicate (metakaolin) and an alkali metal hydroxide.

The reaction mixture is then passed through one or more additional stages, preferably (especially if crystalline aluminosilicates are desired) 3 or more further stages (in a reactor cascade), whilst maintaining the above temperatures or, where appropriate, raising the temperature progressively within the limits which have been defined.

If crystalline products are desired, it is advisable to carry out at least the last stage at from 80° to 100° C. When preparing amorphous products, temperatures of from 30° to about 60° C. suffice in all stages.

After isolating the aluminosilicate, following the last stage, the mother liquor is recycled to the process, i.e. to one of the preceding stages, and at the same time the above starting materials are replenished.

The FIGURE shows, by way of example, a flow chart for the continuous operation of a 4-cascade reactor.

The alkali metal silicate (1) and alkali metal aluminate (2) flow through the lines (1) and (2) into the stirred kettles (3) and from there the mixture flows into the separating apparatus (7), into which wash water can, if desired, be introduced through line (9). From the apparatus (7), the moist aluminosilicate mass which has been separated off passes into the wet mill (8), into which water may, if desired, be introduced through line (17). The wet-milled finished suspension is taken off through line (16) (see below).

From the separating apparatus (7), the mother liquor is taken off through line (10), with or without discharge of a part thereof through line (18), and is recycled, with or without evaporative concentration in the vessel (12), into the vessel (13), whilst fresh aluminate in the form of alkali metal hydroxide (14) and Al(OH)$_3$ (15) are fed into (13) through lines (14) and (15). From (13), the aluminate-containing concentrated mother liquor re-enters line (2), whilst at the same time fresh silicate is fed in through line (1).

On the vessel (12), there is a line (11), through which steam, which is formed if the mother liquor is subjected to evaporative concentration, is discharged.

Downstream of the kettle (5), part of the reaction mixture can be recycled to kettle (4) through line (19).

Not later than in the last kettle (kettle (6) in the present diagram), the reaction mixture conforms to the following composition, expressed in molar ratios:

$Me_2O:SiO_2 = 1.5-2.5$ $SiO_2:Al_2O_3 = 1.7-2.2$ $H_2O:Me_2O = 25-100$ where Me is an alkali metal atom.

The aqueous slurries obtained by the various methods of synthesis and especially by the synthesis described above are separated mechanically (for example in the separating apparatus (7) described above), preferably by filtration. The moist residue can be milled directly, but it is advantageous first to subject it to a wash, whereby the impurities are removed and the high pH of about 12-14, attributable to the conditions of synthesis, is reduced to the value of 10-12 which is conventional in detergents. Preferably, the pH is brought to 10-11. Washing is carried out—according to the degree of contamination, which depends on the nature of the starting materials and on the method of synthesis—with water (see above) or a dilute acid, preferably mineral acids, which under the prevailing conditions are unable to undergo a chemical reaction with the aluminosilicates. If an acid is used, it is preferably sulfuric acid or a polyphosphoric acid.

The residue which, depending on the method of separation, the type of filter and the washing process, if any, may contain varying amounts of water, is according to the invention, subjected to wet milling, without intermediate drying, either directly or after dilution with additional water to a water content of up to 80 percent by weight.

Intermediate drying, and subsequent resuspension, does not give the result achieved by the invention, ie. it is essential to follow the stated procedure.

Wet milling is carried out in conventional apparatus, such as ball mills, stirred ball mills or rotor mills. It is not necessary to add a dispersant or stabilizer.

The residence time in the mill is in general from 0.5 to 120 minutes, and particles of average size from 1 to 10 μm are obtained. A shorter residence time leads to lower stability and poorer flow and pumpability of the suspensions. A longer residence time offers no additional advantages.

The preferred residence time is from 1 to 60 minutes, and gives particle sizes averaging from 3 to 5 μm (95% < 10 μm).

If the residue is wet-milled without dilution, the concentration can also be adjusted subsequently, if necessary, by adding water up to the limits stated earlier.

The amount of water to be added before or after wet milling depends on the method of separation used, which in turn determines the moisture content of the residue. If a suction belt filter is used, for example, the filter cake has a moisture content of about 50 percent by weight, based on the aluminosilicates containing bonded water, whilst the moisture content of a filter cake obtained from a pressure filter, for example from a filter press, is of the order of magnitude of about 35 percent by weight.

The final concentration of the suspensions should be such as to correspond to a solids content of from 20 to about 60 percent by weight.

The surprising aspect of the results achieved according to the invention is that conventional suspensions of the same particle size are not storage-stable and are also insufficiently pumpable and pourable.

For example, whilst finely divided dispersions are obtainable by the process of German Published Application No. DAS 2,744,784, they do not exhibit the desired properties.

The results are equally unfavorable if dry-milled aluminosilicates or dried and subsequently re-moistened wet-milled materials are suspended in water. Evidently, therefore, it is not the particle size which is the reason for the success achieved by the invention.

The Examples which follow illustrate the invention.

The quality of the suspensions formed is assessed by visual observation of the sedimentation behavior. The characterization of the latter is carried out in an upright cylinder containing a 10 cm column of suspension, by observing the supernatant clear layer of liquid which forms as a result of sedimentation of the silicate particles. In the case of storage-stable suspensions, this layer accounts for not more than 10 percent of the column height after 24 hours and not more than 15 percent after 48 hours.

In the experiments on which the Examples are based the following mills were used.
(1) PE 075 laboratory mill
  volume: 0.75 liter
  charge: 55% of grinding medium
  grinding: glass/1 mm φ medium
  Manufactured by Netzsch, D 8672 Selb, Federal Republic of Germany.
(2) KM 2 mortar mill
  Manufactured by Retsch KG, D 5657 Haan near Düsseldorf, Federal Republic of Germany.
(3) 170 jet mill
  volume: 0.34 liter
  Manufactured by BASF AG, 6700 Ludwigshafen, Federal Republic of Germany.
(4) LM 15 mill
  volume: 15.00 liters
  charge: 70% of grinding medium
  grinding medium: glass/1 mm φ
  Manufactured by Netzsch, D 8672 Selb, Federal Republic of Germany.

The aluminum silicate filter cake, which has various residual moisture contents depending on the filtration apparatus (about 40-50% by weight, based on $Na_2O.Al_2O_3.2SiO_2.4.5H_2O$ (zeolite A)) was brought to a solids content of 30 or 40% by weight by mixing with demineralized water in a simple stirred vessel and was then introduced into the mill either in portions or continuously.

A value $X_{90}$ means, for example, that 90% of the particles are smaller than the stated value; other subscripts are used similarly.

EXAMPLE 1

0.288 liter of a zeolite A suspension which had been obtained by one of the conventional batchwise processes of preparation, and which had a solids content of 40% by weight and a particle distribution of $X_{90}$: 11 μm, $X_{50}$: 7.4 μm and $X_{15}$: 6 μm, was introduced, without prior intermediate drying, into a PE 075 laboratory mill. The milling time was 20 minutes, with the stirrer running at 1,200 rpm. The solid in the resulting suspension had the following particle size distribution:
$X_{90}$: 5.1 μm,
$X_{50}$: 3.3 μm,
$X_{15}$: 1.7 μm.

In the sedimentation test, the following data were found:
clear zone after 24 hours: 8.0%;
clear zone after 48 hours: 10.5%.

EXAMPLE 2

The same experimental conditions as in Example 1 were used, except that a 30 percent strength by weight suspension was employed.
Particle size distribution of the solid:

|  | $X_{90}$ | $X_{50}$ | $X_{15}$ |
|---|---|---|---|
| Initial values: | 11 μm | 7.4 μm | 6 μm |
| Final values: | 3.9 μm | 2.9 μm | 1.6 μm |

Sedimentation test:
clear zone after 24 hours: 6.8%;
clear zone after 48 hours: 9.5%.

COMPARATIVE EXAMPLE A

A dried pulverulent aluminum silicate of the formula $Na_2O.Al_2O_3.2SiO_2.4.5H_2O$, was milled for 12 hours in a KM 2 mortar mill.
Particle size distribution:

| before milling: | $X_{90}$: 20 μm; | after milling: | $X_{90}$: 5.6 μm; |
|---|---|---|---|
|  | $X_{50}$: 8 μm; |  | $X_{50}$: 3.7 μm; |
|  | $X_{15}$: 5 μm; |  | $X_{15}$: 2.4 μm. |

This solid was stirred with water, without the addition of any dispersant, to give a 40 percent strength suspension. In the sedimentation test, the suspension obtained showed fundamentally different behavior from the suspensions according to the invention. After 24 hours, about 95% of the solids had settled out to form a sediment which could only be stirred up with great difficulty (volume about 35%, based on on the total volume of the suspension), whilst the supernatant liquid was noticeably cloudy. After 48 hours, the sediment could no longer be stirred up. The supernatant liquid began to clear slowly.

COMPARATIVE EXAMPLE B

A dried, pulverulent aluminum silicate, $Na_2O.Al_2O_3.2SiO_2.4.5H_2O$, was milled in a jet mill. The resulting solid was suspended in demineralized water to give a 40 percent strength suspension, which was then treated further in the PE 075 laboratory mill, as described in Example 1.
Particle size distribution of the solid:

|  | $X_{90}$ | $X_{50}$ | $X_{15}$ |
|---|---|---|---|
| Starting values*: | 6.6 | 4.9 | 3.5 |
| Final values: | 4.9 | 3.3 | 1.8 |

(*after jet milling).

The sedimentation behavior was comparable to the unfavorable behavior of the suspension from Comparative Example A, except that the sediment was easier to stir up.

In contrast to the suspensions according to the invention, which after the test periods could be readily poured out together with the solid, the sediment in the case of the Comparative Examples remained behind as a solid mass on pouring out the liquid.

The Examples which follow described a continuous milling procedure.

EXAMPLE 3

200 kg of material from the filter (28.6% moisture content, based on $Na_2O.Al_2O_3.2SiO_2.4.5H_2O$) were introduced into a stirred kettle (V=300 liters) and suspended in 157 kg of demineralized water (giving a suspension of about 40 percent strength by weight). This suspension was treated in the LM 15 mill at a throughput of 1,500 kg/hour.
Particle size distribution of the solid:

|  | $X_{90}$ | $X_{50}$ | $X_{15}$ |
|---|---|---|---|
| Initial values: | 7.4 μm | 5.9 μm | 4.9 μm |
| Final values: | 4.9 μm | 3.4 μm | 1.5 μm |

Sedimentation test:
clear zone after 24 hours: 8.3%;
clear zone after 48 hours: 12.0%.

EXAMPLE 4

200 kg of material from the filter (51.8% moisture content, based on $Na_2O.Al_2O_3.2SiO_2.4.5H_2 O$) were introduced into a stirred kettle (V=300 liters) and suspended in 41 kg of demineralized water (giving a suspension of about 40 percent strength by weight). This suspension was treated in the LM 15 mill at a throughput of 450 kg/hour.
Particle size distribution of the solid:

|  | $X_{90}$ | $X_{50}$ | $X_{15}$ |
|---|---|---|---|
| Initial values: | 8.1 μm | 6.8 μm | 5.9 μm |
| Final values: | 3.7 μm | 1.8 μm | 0.6 μm |

Sedimentation test:
clear zone after 24 hours: 5.2%;
clear zone after 48 hours: 8.9%.

EXAMPLE 5

A 6-stage reaction cascade was employed for the continuous preparation of a sodium aluminosilicate of the formula $Na_2O.Al_2O_3.2SiO_2.4.5H_2O$.

All vessels in the cascade were equipped with magnetic stirrers. In each case the suspension was taken off at the bottom of the vessel and fed to the next cascade stage at the surface. 20% by volume of the suspension issuing from stage 5 were recycled to stage 3.

The residence times and temperature are shown in the Table below:

| Reaction vessel | 1 | 2 | 3 | 4 | 5 | 6 |
|---|---|---|---|---|---|---|
| Temperature (°C.) | 50 | 50 | 70 | 85 | 90 | 93 |
| Residence time (h) | 0.12 | 0.48 | 0.32 | 0.32 | 0.32 | 0.38 |

In the first reaction vessel, precipitation took place as a result of introducing a commercial waterglass solution containing 27.0% of $SiO_2$ and 8.3% of $Na_2O$ and having a density of 1.355, and a sodium aluminate solution containing 4.8% by weight of $Al_2O_3$ and 8.54% of $Na_2O$. The waterglass solution was introduced at a rate of 0.6 liter/h and the aluminate solution at 3.6 liters/h.

On calculating the molar ratios of the individual components in the total mixture, it was found that $NaO_2/SiO_2 = 1.9$, $SiO_2/Al_2O_3 = 1.9$ and
$H_2O/Na_2O = 32$.

The product issuing from the last reaction vessel consisted of a product which according to X-ray diffraction was almost pure zeolite A, with only traces of hydroxysodalite (<2%). The mean particle size, namely $X_{50}$, was 20 μm.

In order to increase the solids content of the suspension, the latter was introduced into a concentrator, from where the concentrated sediment was drawn off for filtration. The clarified filtrate was replenished with $Al_2O_3$ and $Na_2O$ and then recycled to the precipitation. The thoroughly washed filter cake had a residual water content of only 25-30 percent. On adding distilled water and subjecting the mixture to only a single pass of 20 minutes through an 0.75 liter laboratory stirred ball mill filled with 0.425 liter of glass beads of 1 mm diameter, with the eccentric ring stirrer running at 1,200 rpm, a pourable and hence also pumpable suspension of 40% solids content was obtained. The mean particle size $X_{50}$ was 2.5 μm, the proportion of particles smaller than 1 μm was less than 10% and the proportion larger than 15 μm was substantially less than 5%. Less than 1% by weight of the particles were larger than 15 μm. The sedimentation test gave a clear zone of 8.5% after 24 hours and of 11.5% after 48 hours.

EXAMPLE 6

Continuous preparation of a wet-milled suspension of amorphous sodium aluminosilicate $Na_2O.Al_2O_3.2SiO_2.xH_2O$ (the water content fluctuates greatly in the case of amorphous products).

The Example demonstrates the continuous preparation of a storage-stable suspension of amorphous sodium aluminosilicate.

A cascade with only two stages was employed.

| Reaction vessel | 1 | 2 |
|---|---|---|
| Temperature (°C.) | 50 | 50 |
| Residence time (h) | 0.12 | 0.38 |

The construction and operation of the two cascade stages corresponded to the description in Example 1. A waterglass solution (containing 27.0% of $SiO_2$ and 8.3% of $Na_2O$) at the rate of 0.6 liter/h, and a sodium aluminate solution (containing 11.0% of $Na_2O$ and 4.8% of $Al_2O_3$, remainder $H_2O$) at the rate of 3.6 liters/h were metered into vessel 1. The suspension formed in vessel 1 flowed through vessel 2, from which it was drawn off.

In a downstream clarifier, a pre-clarification by simple sedimentation took place. The suspension, thereby enriched in solids, was drawn off from the bottom of the pre-clarifier and filtered. The filtrate and the solution obtained by pre-clarifying were restored to a concentration of 11.0% of $Na_2O$ and 4.8% of $Al_2O_3$ by adding NaOH and $Al(OH)_3$ and were recycled to the precipitation process.

The molar ratios in the combined mixture of waterglass solution and sodium aluminate solution were $Na_2O/SiO_2 = 2.4$, $SiO_2/Al_2O_3 = 1.8$ and
$H_2O/Na_2O = 26$.

The resulting product consisted of a sodium aluminosilicate which according to X-ray diffraction was amorphous, and had the chemical composition $Na_2O.Al_2O_3.2SiO_2.xH_2O$, where x is from 0 to about 3, depending on the drying temperature and drying time of the amorphous aluminosilicate (1 h at 800° C.; 16 h at 25° C.).

The moist filter cake, having a total water content of 64%, was milled, in the form of a suspension of 30% by weight solids content, with residence times of 5, 10 and 20 minutes, to give values of $X_{50} = 2.5$ μm, 1.8 μm and 1.3 μm respectively.

The suspensions of 30% solids content obtained by wet milling proved to be easily pourable and pumpable. Sedimentation behavior:

clear zone (24 h): 8% clear zone (48 h): 10.5%.

We claim:

1. A process for the preparation of storage-stable, pourable and pumpable aqueous suspensions without the use of dispersants or stabilizers which contain, based on the suspension, from 20 to about 60 percent by weight of finely divided, water-soluble aluminosilicates with calcium-exchangeable cations, comprising the steps of:

mechanically separating the aluminosilicates which are obtained in aqueous suspension after their preparation, wet milling the resulting moist aluminosilicate mass without intermediate drying, either directly or after having added water to bring its water content to a value of up to 80 percent by weight to an average particle size of 1 to 5 μm, and bringing the resulting milled material, where necessary, to the desired solids content to produce a storage-stable, pourable and pumpable aqueous suspension, without the use of dispersants or stabilizers, which contains from 20 to about 60 percent, based on the suspension, of finely divided, water-insoluble aluminosilicates with calcium-exchangeable cations.

2. The process of claim 1, wherein, before wet milling, the moist aluminosilicate is washed with water or with an aqueous mineral acid until the pH is from 10 to 11.

3. The process of claim 1, wherein the wet milling residence time is from 1 to 60 minutes.

4. The process of claim 1, wherein the aluminosilicate mass to be wet-milled has been obtained at from 30° to 100° C. by the following continuous process:

(a) the alkali metal silicate and alkali metal aluminate, alkali metal silicate donor and alkali metal aluminate donor, or aluminum silicate and alkali metal hydroxide, are brought together in an aqueous medium,
(b) the resulting reaction mixture is passed through a reactor cascade having not less than two stages, with a total residence time of from 0.1 to about 8 hours,
(c) the resulting aluminosilicate is separated from the mother liquor and
(d) the mother liquor is recycled to one of the preceding stages and the starting materials consumed during the reaction are replenished, the reaction mixture having, no later than the last stage, a molar composition corresponding to $Me_2O:SiO_2 = 1.0-2.5$ $SiO_2:Al_2O_3 = 1.5-2.2$ $H_2O:Me_2O = 25-100$ where Me is an alkali metal.

5. The process of claim 4, wherein a crystalline aluminosilicate mass, in the preparation of which at least the last reaction stage was maintained at 80°–100° C., is subjected to wet milling.

* * * * *